April 1, 1958    F. E. McMULLEN    2,828,672
ROTARY CUTTER FOR GEARS AND THE LIKE
Filed July 8, 1955    2 Sheets-Sheet 1

Inventor
FREDERICK E. McMULLEN
By
Richard W. Treverton
Attorney

April 1, 1958   F. E. McMULLEN   2,828,672
ROTARY CUTTER FOR GEARS AND THE LIKE
Filed July 8, 1955   2 Sheets-Sheet 2

*Inventor*
FREDERICK E. McMULLEN
By
Richard W. Treverton
*Attorney*

United States Patent Office 2,828,672
Patented Apr. 1, 1958

2,828,672

ROTARY CUTTER FOR GEARS AND THE LIKE

Frederick E. McMullen, Rochester, N. Y., assignor to The Gleason Works, Rochester, N. Y., a corporation of New York Application July 8, 1955, Serial No. 520,733

15 Claims. (Cl. 90—1)

The present invention relates to rotary cutters for gears, toothed clutches and the like, of the type in which a plurality of cutting blades are carried by the peripheral portion of a generally disc-shaped cutter head.

The conventional cutter of this kind has a plane rear face for seating on a plane front face of the machine spindle, to maintain the cutter in a plane exactly perpendicular to the spindle axis. Such a cutter also has a tapered central bore which seats with a draw fit onto a similarly tapered nose of the spindle, which projects forwardly from the afore-mentioned plane front face, for holding the cutter concentric with the spindle axis. The cutter is secured to the spindle, in the relationship described, by one or more screws which usually are coaxial with or parallel to the spindle axis. Despite these controls it is found that when a cutter is transferred from one spindle to another, as for example to the spindle of a tooth cutting machine from the spindle of a machine on which the cutter blades are ground or sharpened, or are otherwise trued, there is a shifting of the cutting edges of the blades relative to each other and to the axis of the spindle. Thus a cutter which has been found to be true within acceptable tolerances prior to mounting on the cutting machine spindle will be found to be unsatisfactory after being mounted, necessitating a retruing operation or replacement of the cutter.

It has been discovered that this difficulty may be overcome or at least alleviated to a substantial degree by providing an annular groove on the inner face of the cutter head, the groove being disposed between the central or hub portion of the head which is drawn onto the tapered nose of the spindle and the outer portion of the head which supports the blades and is clamped against the plane front face of the spindle. For best results the groove is made deep enough to completely surround that part of the cutter bore which has a draw fit with the spindle nose.

The foregoing and other objects and advantages will appear from the following detailed description of the several preferred embodiments of the invention shown in the accompanying drawings, wherein.

Figure 1:
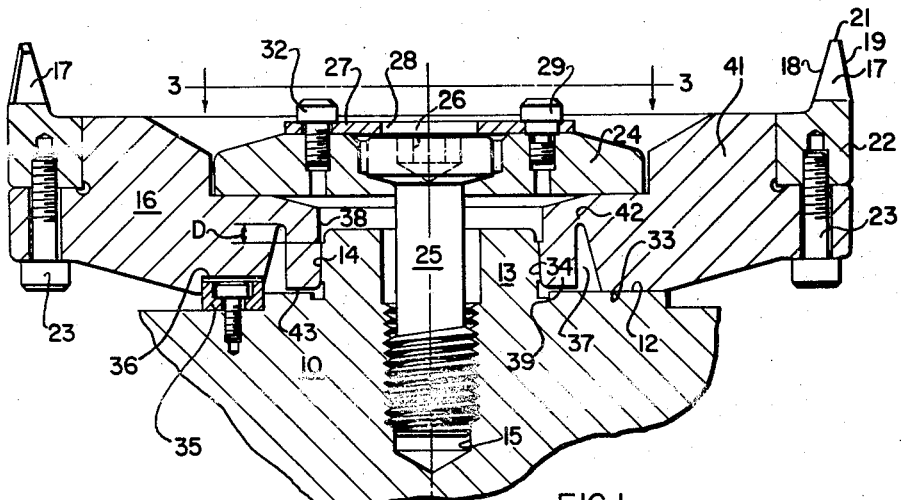
Fig. 1 is a sectional view through a face mill cutter and the adjacent part of the machine spindle, the view being in a plane containing the axis of rotation of the cutter and the spindle.
Figure 2:
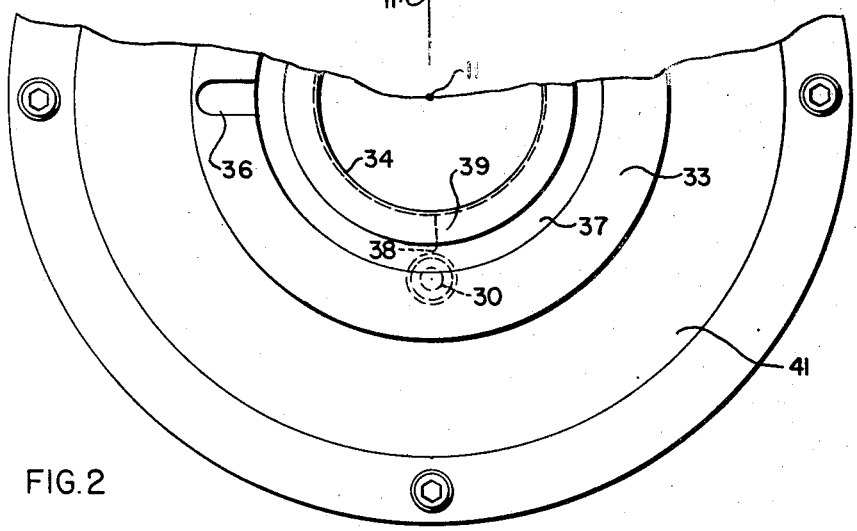
Fig. 2 is a fragmentary elevation showing the rear face of the cutter when removed from the spindle.
Figure 3:
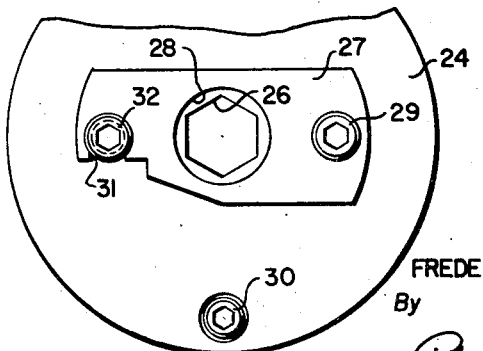
Fig. 3 is a fragmentary elevation, in the plane designated 3—3 of Fig. 1, showing a clamp plate on the front face of the cutter, and related parts.

The cutter spindle 10 in Fig. 1 is mounted to rotate about axis 11 on a suitable support on the tooth cutting machine, not shown. The front face 12 of the spindle is plane and perpendicular to the axis 11. Protruding forwardly from this face is the spindle nose 13 which has a slightly tapered peripheral surface 14 concentric with axis 11. A screw-threaded bore 15 in the spindle nose is also concentric with axis 11.

The cutter comprises a substantially disc-shaped body 16, usually known as the cutter head, from which there projects forwardly, i. e. in the general direction of axis 11, a plurality of cutting blades 17. These cutter blades usually are arranged in a circle concentric with the axis 11, although in some instances they may lie along one or more spirals about the axis. The front faces of the blades, i. e. the faces which meet the work as the cutter rotates, have inner and outer side edges, 18 and 19 respectively, and tip edges 21. In some cutters only the inside edges and tip edges are cutting edges, while in others only the outside edges and tip edges cut. In other cutters alternate blades have inside cutting edges and outside cutting edges, respectively, every blade also having a tip cutting edge. In still other cutters, alternate blades may have tip cutting edges and side cutting edges, respectively. Various other arrangements are also known. The particular cutter illustrated has all of its blades formed integrally with a ring 22 that is secured to the head 16 by screws 23 and also by having a shrink-fit thereon.

The cutter is secured to the spindle by a clamp disc 24 and screw 25, the disc being secured to the cutter head by a pair of screws 30 and the clamp screw 25 extending through a central opening in the disc and into the screw-threaded bore 15 of the cutter head. The head of screw 25 is provided with a wrench socket 26 and is releasably retained in a recess in the front face of clamp disc 24 by a plate 27 which has a central opening 28 through which a wrench may be inserted into the socket 26. This plate is pivoted at one end thereof to the disc 24 by a screw 29 and at the other end thereof has a notch 31 to pass the shank of another screw 32 that is secured to the disc. The notch enables the plate to be pivoted to and from a position in which it underlies the head of screw 32. Thus the plate is supported at both ends, forming a bridge over the head of screw 25 against which the screw 25 may react when it is turned to jack the cutter loose from the spindle. After the cutter has been loosened from the spindle the plate 27 may be swung about pivot 29 to a position clear of screw 25 to enable removal of the latter from the cutter prior to removal of the cutter from the spindle.

The rear face portion 33 of the cutter head is clamped by the screw 25 against the front plane face 12 of the spindle to accurately position the cutter in a plane perpendicular to the axis 11. A tapered central bore 34 in the cutter head has a draw fit with the tapered surface 14 of the spindle nose when the cutter head abuts the face 12. A key 35 secured to the front of the spindle engages in a keyway 36 in the rear face of the cutter to transmit driving torque from the spindle to the cutter, and, in some cases, to assure a predetermined phase relation between the cutter blades and the drive mechanism for the spindle.

According to the present invention an annular groove 37 is provided in the rear face of the cutter head, concentric with the axis 11. This groove is preferably slightly deeper, by distance D, than the depth of engagement of spindle nose surface 14 with tapered bore 34. In other words the depth of the groove is such that the groove surrounds either completely, or at least nearly completely, the part of the bore 34 which has the draw fit with the spindle nose. To assure this relationship the length of the contact between the spindle nose and the bore preferably is limited by a counterbore 38 in the forward end of tapered bore 34. In other words the counterbore is preferably of such depth that it is slightly overlapped by the groove 37. The effect of the groove is to provide at the center of the cutter head a hub portion 39 which is connected to the blade-carrying part 41 of the cutter head by a relatively thin web 42. The rear face 43 of this hub portion is made to lie in a plane forward of rear face portion 33, so as not to abut face 12 of the spindle.

As shown in Fig. 1 the clamp disc 24 contacts the front face of the cutter head in a zone lying outwardly of the web 42, so that clamping pressure exerted by screw 25, to clamp the cutter against spindle face 12, is applied directly against the relatively thick blade-carrying part 41 of the cutter head. With this arrangement the rigidity of the connection between the cutter and the spindle is in no way affected by flexibility of the web 42.

It is theorized that when a conventional cutter, not having groove 37, is clamped on its spindle, the nose of the spindle compresses the metal around the central bore in the cutter, introducing strains into the cutter head; that due to very slight dimensional differences between the noses of different spindles the same cutter head may be strained differently when on the cutting machine than when on the machine on which the cutter blades were trued, with the result that the blades are moved out of true; and that the groove 37, by enabling the hub portion 39 of the cutter to be strained with minimal resulting distortion of the blade-carrying portion 41, eliminates either entirely or to very great degree the untruth of the blades due to the cutter mounting. Whatever may be the correct theory, the provision of the groove 37 has been found in practice to greatly improve the truth of the cutting edges of a cutter installed on a tooth cutting machine subsequent to a truing operation.

Figure 4:
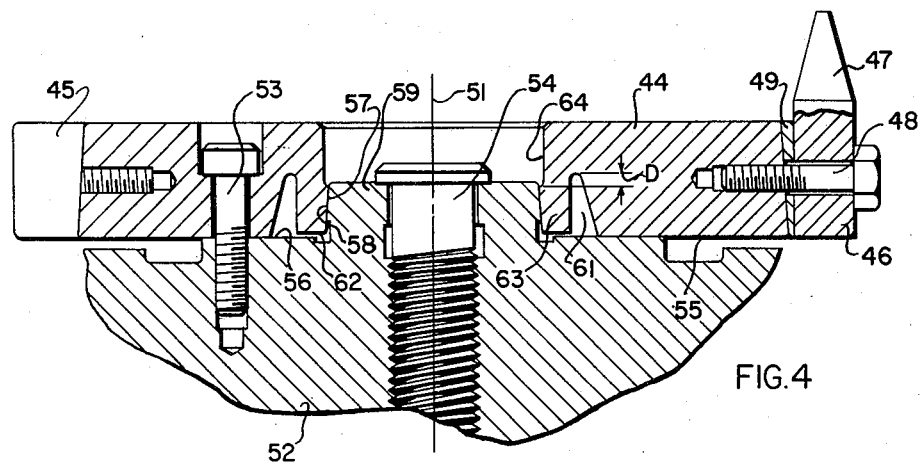
Fig. 4 is an axial sectional view generally similar to Fig. 1, showing a modified form of face mill cutter, of the inserted blade type, mounted on a machine spindle.
Figure 5:
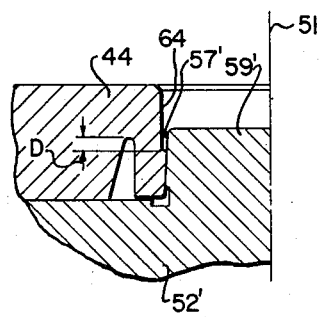
Fig. 5 is a fragmentary sectional view illustrating a cutter of the kind shown in Fig. 4 mounted on a spindle of slightly different form.

In Fig. 4 is shown another type of rotary cutter for gears and the like, comprising a disc-shaped cutter head 44 which has about its periphery a plurality of notches 45 each adapted to seat the shank 46 of a cutter blade 47. Each blade is secured to the head by a screw 48, and, if desired, a shim or a wedge 49 may be inserted between the blade and the bottom of the notch 45 to adjust the blade radially, i. e. toward or away from the cutter and spindle axis 51. The cutter head is secured to the machine spindle 52 by a plurality of screws 53 which are arranged in a circle about axis 51, only one of these screws appearing in Fig. 4. The spindle has a central screw-threaded bore which is plugged by a screw 54 when this cutter is being used. The rear face 55 of the cutter head seats on plane front face 56 of the spindle and the tapered central bore 57 of the head seats on the tapered peripheral surface 58 of the spindle nose 59. An annular groove 61 is formed in the rear face of the cutter head to a depth exceeding by distance D the depth of contact of the spindle nose. Also, as in the case of the cutter shown in Fig. 1, the rear face 62 of the hub portion 63 that is defined by the groove is slightly spaced from the front face 56 of the spindle; and the tapered bore 57 in the head is counterbored at its forward end as indicated at 64. An advantage of this counterbore is shown in Fig. 5 in which the same cutter that appears in Fig. 4 is mounted on a spindle 52' having a nose 59' that is longer than nose 59. As shown the counterbore limits the length of the contact between the spindle nose and the cutter bore so that the distance D remains the same in Fig. 5 as in Fig. 4 despite the greater length of the tapered surface 57'. It will also be noted that in Fig. 4 the means for clamping the cutter to the spindle, i. e. the screws 53, are disposed outwardly beyond the groove 61, this being the same in principle as the clamp disc 24 in Fig. 1 bearing upon the part of the cutter head that is disposed outwardly beyond the groove 37.

Figure 6:
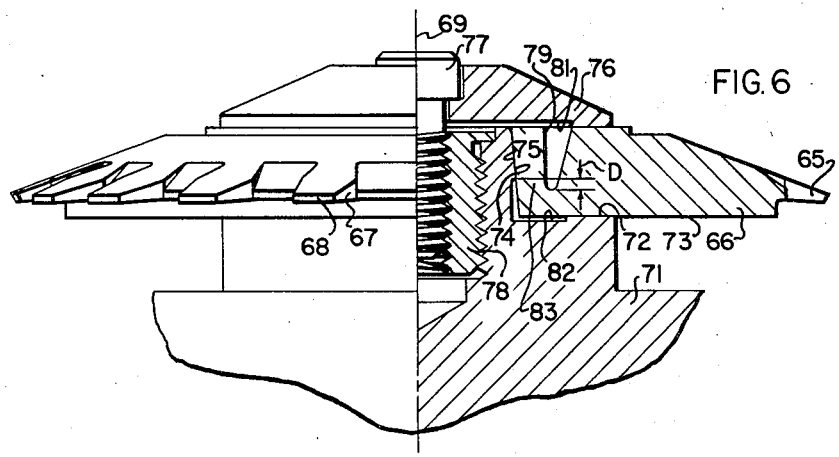
Fig. 6 is a view, partly in elevation and partly in axial section, showing a disc type cutter mounted on a machine spindle.

In the form of cutter shown in Fig. 6 the cutting blades 65 are integral with and extend radially from the cutter head 66, each blade having a side cutting edge 67 and a tip cutting edge 68 for respectively cutting one side and the bottom of a tooth space. Cutters of this type are conventionally used in pairs, of opposite hand, with the axis 69 of each cutter inclined at an acute angle to the corresponding axis of the other cutter and with both cutters positioned to operate simultaneously in the same tooth space of the part being cut. The cutter spindle 71 has a plane front face 72 for seating the rear face 73 of the cutter and a tapered nose 74 for seating in tapered bore 75 of the cutter. The cutter is secured to the spindle by means of a clamp disc 76 and a screw 77, the latter being screw-threaded into a nipple 78 which in turn is screw-threaded into and in effect constitutes a part of spindle 71. The front face of the cutter head is provided with an annular groove 79 which overlaps by dimension D the part of the tapered bore which has a draw fit with the spindle nose. The clamp disc has a central recess 81 so that it bears upon the relatively thick part of the cutter outside of the annular groove 79; and the spindle has a similar recess 82 inside of the cutter seating surface 72 thereof, to clear the hub portion 83 of the cutter head.

It will be understood that the foregoing disclosure is made by way of illustration and example of the inventive principles involved, and not by way of limitation, and that these principles may be embodied in various other forms of cutters of the general kind described, without departing from the spirit of my invention or from the scope of the appended claims.

What I claim is:

1. A rotary cutter for gears, toothed clutches or the like, having a substantially disc-shaped head and a plurality of cutting blades projecting from the peripheral portion of the head, the head having a rear face portion for seating upon a forward face of a cutter-supporting spindle and also having a tapered central bore for seating with a draw fit upon a tapered nose of the spindle, characterized by an annular groove in one face of the head, said groove defining a hub portion of the head which is separated from the bldae-carrying part of the head by a relatively thin web, the rear face portion of the head which seats on the spindle being disposed outwardly of said groove.

2. A cutter according to claim 1 in which a part of the front face of the head comprises a seat for a clamp disc or the like, by means of which the cutter is clamped to the spindle, said seat being on the portion of the head disposed outwardly beyond said annular groove.

3. A cutter according to claim 1 in which the head has a plurality of openings for clamp screws which secure the cutter to the spindle, said openings extending through the portion of the head which lies outwardly beyond said annular groove.

4. A cutter according to claim 1 in which the annular groove is on the rear face of the cutter, and the rear face of the hub portion is forward of the rear face portion which seats on the spindle.

5. A cutter according to claim 1 in which the depth of the annular groove is such that the groove surrounds substantially completely that part of the tapered bore which has a draw fit with the spindle nose.

6. A cutter according to claim 5 in which the central bore of the head is counterbored on the side thereof opposite said groove to a depth such that the groove overlaps the counterbore.

7. A rotary cutter and spindle assembly for gears, toothed clutches or the like, the spindle having a plane cutter-seating face and a tapered nose projecting forwardly from said face and concentric with the spindle axis, the cutter having a substantially disc-shaped head and a plurality of cutting blades projecting from the peripheral portion of the head, the head having a rear face portion for seating on said plane face of the spindle and a tapered bore having a draw fit with said tapered nose, and means for securing the cutter to the spindle, the assembly being characterized by the cutter head having an annular groove in one face thereof, said groove defining a hub portion of the head which is separated from the blade carrying part of the head by a relatively thin web, and the rear face portion of the head which seats on the spindle being disposed outwardly of the groove.

8. An assembly according to claim 7 in which the securing means comprise a plurality of headed screws which are threaded into the spindle, said screws extending through openings in the part of the cutter head which surrounds the annular groove.

9. An assembly according to claim 7 in which the central bore of the head is countered on the side thereof opposite from said groove to a depth such that the groove overlaps the counterbore.

10. An assembly according to claim 7 in which the depth of the annular groove is such that the groove surrounds substantially completely that part of the tapered bore which has a draw fit with the spindle nose.

11. An assembly according to claim 10 in which the annular groove is on the rear face of the cutter, and the rear face of the hub portion is forward of the rear face portion which seats on the spindle.

12. An assembly according to claim 7 in which the securing means comprise a clamp disc which engages a part of the front face of the head that is disposed outwardly from said annular groove, and a screw which is threaded into the spindle for drawing the clamp disc rearwardly relative to the spindle.

13. An assembly according to claim 12 in which the clamp disc is secured to the cutter head and a plate is pivoted to said disc for movement between a position overlying the head of the screw and a position clear thereof, whereby the screw may be confined by the plate plate for use in jacking the cutter off the spindle or may be removed from the cutter.

14. A cutter for gears, toothed clutches or the like, adapted to be secured onto a spindle by a screw threaded into the end of the spindle, characterized by a plate connected to the cutter for movement thereon between a first position overlying the head of such screw and a second position clear thereof, whereby the screw may be confined by the plate for use in jacking the cutter off the spindle or may be removed from the cutter, the plate and the screw being so shaped that when the plate is in said first position a wrench may be applied to the screw for rotating it.

15. A cutter according to claim 14 in which the plate is pivotally connected at one end to the cutter on an axis parallel to the screw and there is a part on the cutter overlying an opposite end portion of the plate when the latter is in said first position.

References Cited in the file of this patent

UNITED STATES PATENTS

| | | |
|---|---|---|
| 963,935 | Parker | July 12, 1910 |
| 1,410,506 | Rada | Mar. 21, 1922 |
| 1,472,565 | Manning | Oct. 30, 1923 |
| 1,506,098 | Wade | Aug. 26, 1924 |
| 1,959,901 | Buehle | May 22, 1934 |